(12) United States Patent
Ronchi

(10) Patent No.: US 8,875,867 B2
(45) Date of Patent: Nov. 4, 2014

(54) BOTTLE FEEDING AND PROCESSING SYSTEM

(75) Inventor: Cesare Ronchi, Gessate (IT)

(73) Assignee: Ronchi Mario S.p.A., Milan (IT)

( * ) Notice: Subject to any disclaimer, the term of this patent is extended or adjusted under 35 U.S.C. 154(b) by 202 days.

(21) Appl. No.: 13/634,431

(22) PCT Filed: Mar. 9, 2011

(86) PCT No.: PCT/IB2011/000515
§ 371 (c)(1),
(2), (4) Date: Feb. 1, 2013

(87) PCT Pub. No.: WO2011/110938
PCT Pub. Date: Sep. 15, 2011

(65) Prior Publication Data
US 2013/0167974 A1  Jul. 4, 2013

(30) Foreign Application Priority Data
Mar. 12, 2010  (IT) ............... MI2010A0410

(51) Int. Cl.
*B65G 47/14* (2006.01)
*B65B 37/00* (2006.01)
*B65G 47/24* (2006.01)
*B65G 47/31* (2006.01)

(52) U.S. Cl.
CPC ........... *B65B 37/00* (2013.01); *B65G 2203/041* (2013.01); *B65G 2201/0244* (2013.01); *B65G 47/24* (2013.01); *B65G 47/1457* (2013.01); *B65G 47/31* (2013.01)
USPC ............ 198/396; 198/382; 198/400

(58) Field of Classification Search
CPC ........... B65G 47/1407; B65G 47/1492; B65G 2201/0244; B65G 47/24; B65G 47/1428; B65G 2203/041; B66B 37/00
USPC .......................... 198/395, 396, 400, 374, 382
See application file for complete search history.

(56) References Cited

U.S. PATENT DOCUMENTS 3,624,773 A * 11/1971 Krooss ..................... 198/397.01
3,776,346 A * 12/1973 Dubuit ......................... 198/396
4,825,995 A * 5/1989 Nalbach ....................... 198/380
5,641,072 A * 6/1997 Otake .......................... 198/396
5,713,454 A * 2/1998 Jordan ......................... 198/391

(Continued)

FOREIGN PATENT DOCUMENTS

| EP | 0613841 A1 | 9/1994 |
| EP | 0703167 A1 | 3/1996 |
| EP | 0997406 A2 | 5/2000 |
| FR | 2755680 A1 | 5/1998 |

*Primary Examiner* — James R Bidwell
(74) *Attorney, Agent, or Firm* — Mintz Levin Cohn Ferris Glovsky and Popeo, P.C.

(57) ABSTRACT

System for feeding and processing bottles (1) to be conveyed to a device (30) for entry into a filling machine (40) operating at an assigned speed (Vp), the system comprising: a realignment centrifuge (100) fed randomly with the bottles (1) and having a tangential outlet (113); movement devices (12, 13, 14), able to convey the bottles (1) leaving the realignment centrifuge (100) and vary the speed of advancing movement thereof; at least one device (21) for handling the bottles; the realignment centrifuge is operated at an operating speed (Vc) greater than the speed (Vp) of the filling machine, and movement devices (12, 14) comprise at least a first device (12); a third device (14); said handling device (21) has means (5) for gripping the bottles.

21 Claims, 7 Drawing Sheets

(56) References Cited

U.S. PATENT DOCUMENTS

Figure 1:
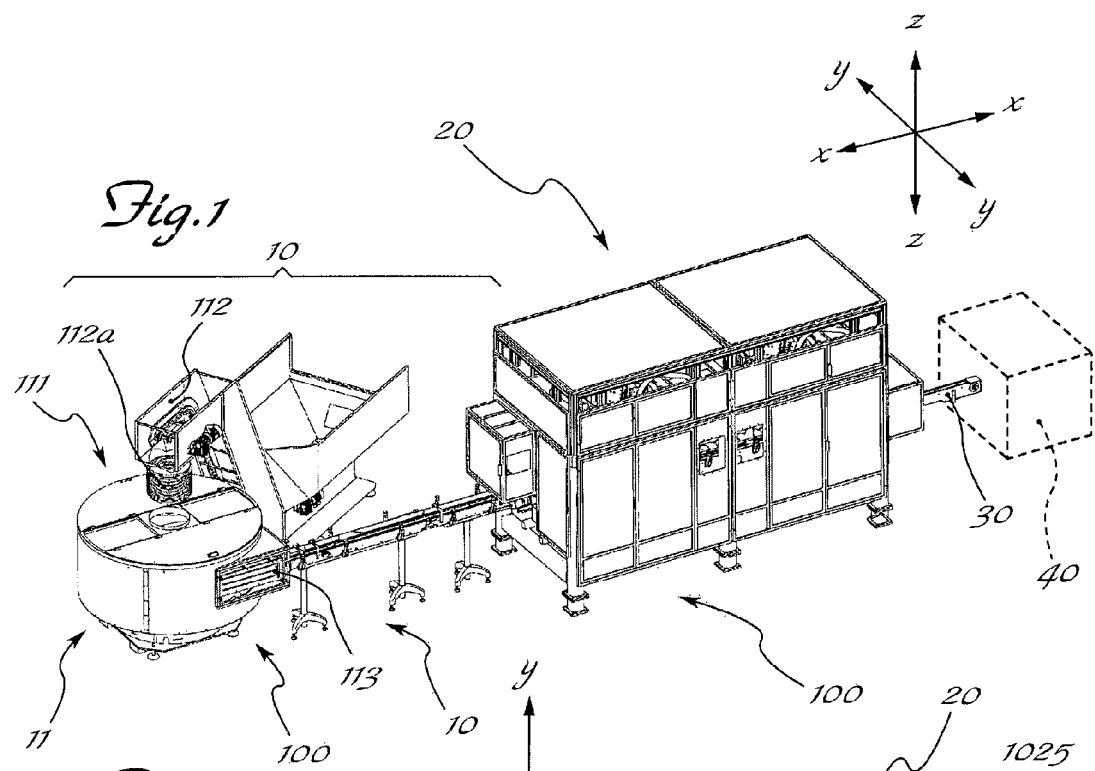

| | | |
|---|---|---|
| 6,378,695 B1 | 4/2002 | Rinne |
| 6,591,977 B2 * | 7/2003 | Spencer et al. ............... 198/374 |
| 7,641,040 B2 * | 1/2010 | Harris .......................... 198/396 |
| 2002/0100663 A1 | 8/2002 | MacLachlan |
| 2004/0084282 A1 * | 5/2004 | Hellmann et al. ............ 198/540 |

* cited by examiner

BOTTLE FEEDING AND PROCESSING SYSTEM

RELATED APPLICATIONS

This application is a national stage application, filed under 35 U.S.C. §371, of International Application No. PCT/IB2011/000515, filed Mar. 9, 2011, which claims the benefit of IT Application No. MI2010A000410, filed Mar. 12, 2010, the contents of each are hereby incorporated by reference in their entireties.

The present invention relates to a bottle feeding and processing system for feeding suitably oriented bottles to machines for filling said bottles.

PRIOR ART

It is known that, in the technical sector relating to the handling of bottles to be filled and sealed using automatic filling machines, there exists the need to feed said bottles in a continuous and uniform manner to a filling machine at a constant speed dependent on the speed of machine itself.

It is also known that, for this purpose, feed apparatus have been developed such that bottles, initially arranged randomly in special containers, can be fed to said filling machines with said bottles arranged in an ordered sequence.

In greater detail said feeding apparatus comprise essentially:

- generally cylindrical, upwardly open, receiving containers into which bottles to be filled are randomly loaded;
- bottle extraction devices via which the bottles, previously loaded into the receiving container, are extracted already in the vertical position from the receiving device itself;
- belts for conveying the extracted vertical bottles;
- a screw feeder or equivalent device suitable for transporting and arranging the bottles in a queue, already correctly oriented, for feeding to the filling machine.

During operation, the receiving containers move with a rotational movement about a vertical axis and, inside them, the bottles are moved by means of the centrifugal force and frictional phenomena towards tangential shaped selectors (also known as pockets) which are provided on the side surface of the receiving container and in a lower position with respect to the bottom of said container.

An extraction device, which is arranged in a suitable position on the circumference of the cylindrical container and below it, extracts the bottles from the shaped selectors, being displaced so as to allow each bottle to fall in an erect position into a seat, for example of a Maltese cross device, suitable for transporting the extracted bottles.

In order to be able to extract in an erect position bottles of different shapes and sizes, the selectors may comprise adjustable retaining blades which may be associated with servomotors so as to be able to moved and adapted to the specific bottles to be extracted.

Although performing their intended function, these known feed apparatus have generally a number of problems which limit their effective efficiency since:

- with each change in the form of the bottles it is required to perform a complex format change-over operation of the realignment machine with replacement of all the selectors for the falling movement or reprogramming of the position of their movable blades;
- because of the irregular and random movement of the bottles loaded into the receiving container, not all the selectors are regularly filled with corresponding bottles, which means that the following conveying device has empty seats corresponding to selectors which previously were not filled.

The presence of these extraction "voids" therefore requires the incorporation, along the line, of a bottle queuing station, said station comprising, for example, a conveyor belt having a "buffer" function which ensures that the bottles are arranged in a continuous queue for the filling and sealing machine.

This means that, in order to obtain the desired technical effect, the queuing station must have a considerable length, which is often incompatible with the spaces available in the premises for installation of the entire plant;

a further drawback consists in the instability of the bottles, on the conveyor belt, which have an irregular shape and/or are round and/or are light; in fact, the greater instability, the greater the possibility that overturning of the bottles results again in discontinuous feeding to the filling station.

In order to solve this problem for those bottles which are difficult to keep in an erect position, the plant must also be provided with a machine which is arranged along the path towards the queuing station and which deposits the bottles into support cups which travel on the belt of the queuing station, transporting the bottles and preventing them from overturning.

In addition, in the case where the bottles must be correctly oriented so that they are always arranged in a predefined position, a further machine must be installed in the plant.

It is therefore clear from the above description how the plants, and in particular the bottle feeding apparatus designed according to the prior art, are substantially unable to ensure an efficiency close to 100%, having moreover a complex structure, being prone to malfunctions owing to the presence of a plurality of mechanical components which are subject to wear, and having large overall dimensions, with the result that the filling machine and hence the entire production line are overall not sufficiently productive.

Examples of machines used in the prior art for feeding bottles in an erect position are for example described in EP 0,703,167 and WO 2009/190379.

The technical problem which is posed therefore is to provide a bottle feeding and processing system for feeding the bottles to filling machine entry devices, which is able to provide a solution to the prior art problems described above, ensuring an optimum feeding efficiency, a reduction in the machine downtime due to the need for format change-over when there is a variation in the form of the bottles, and small overall dimensions.

Said technical problems are solved by a feeding and processing system according to the characteristic features of claim 1.

Figure 2:
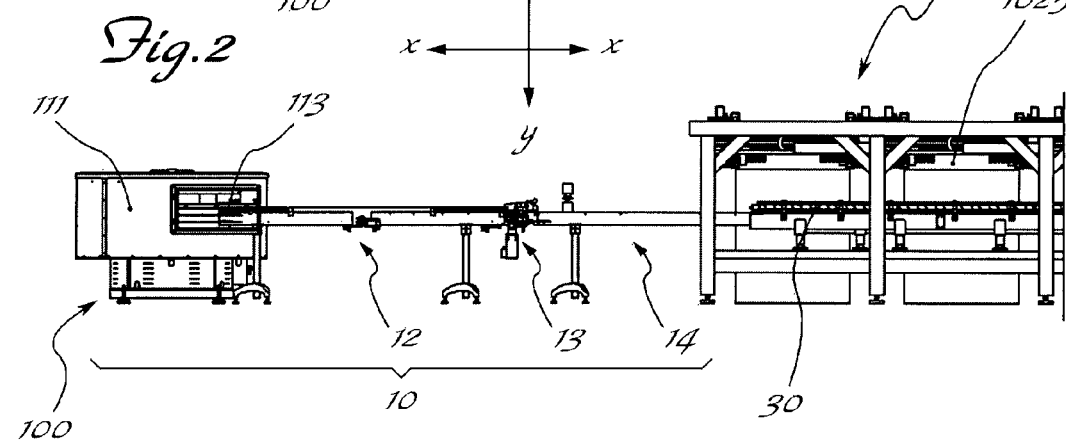
Figure 3:
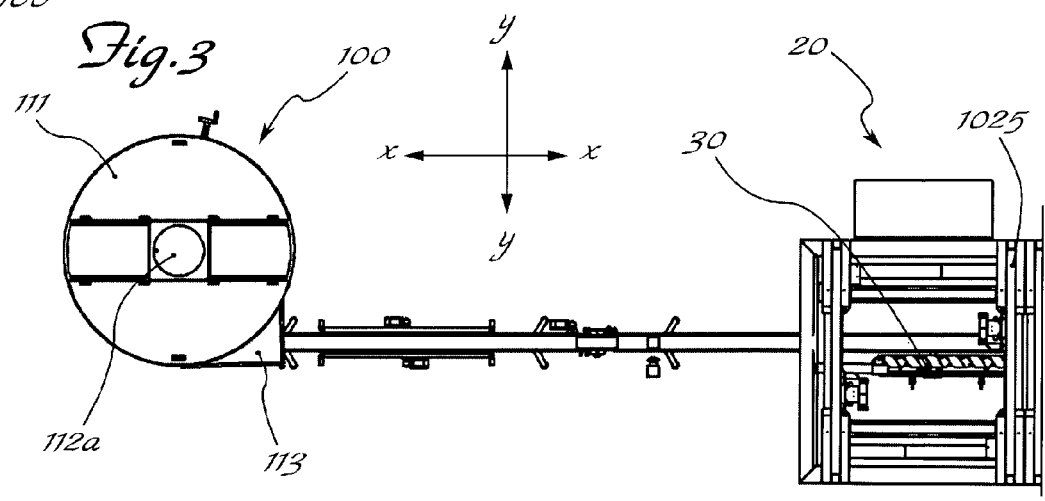
Figure 4:
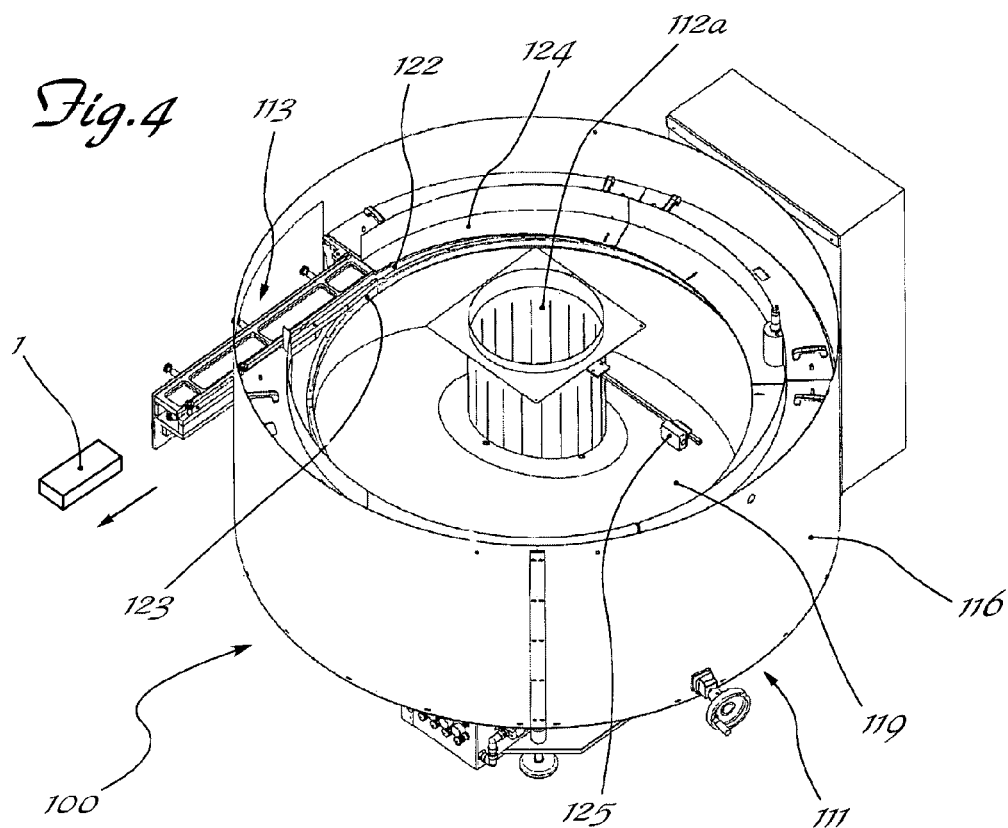
Figure 5:
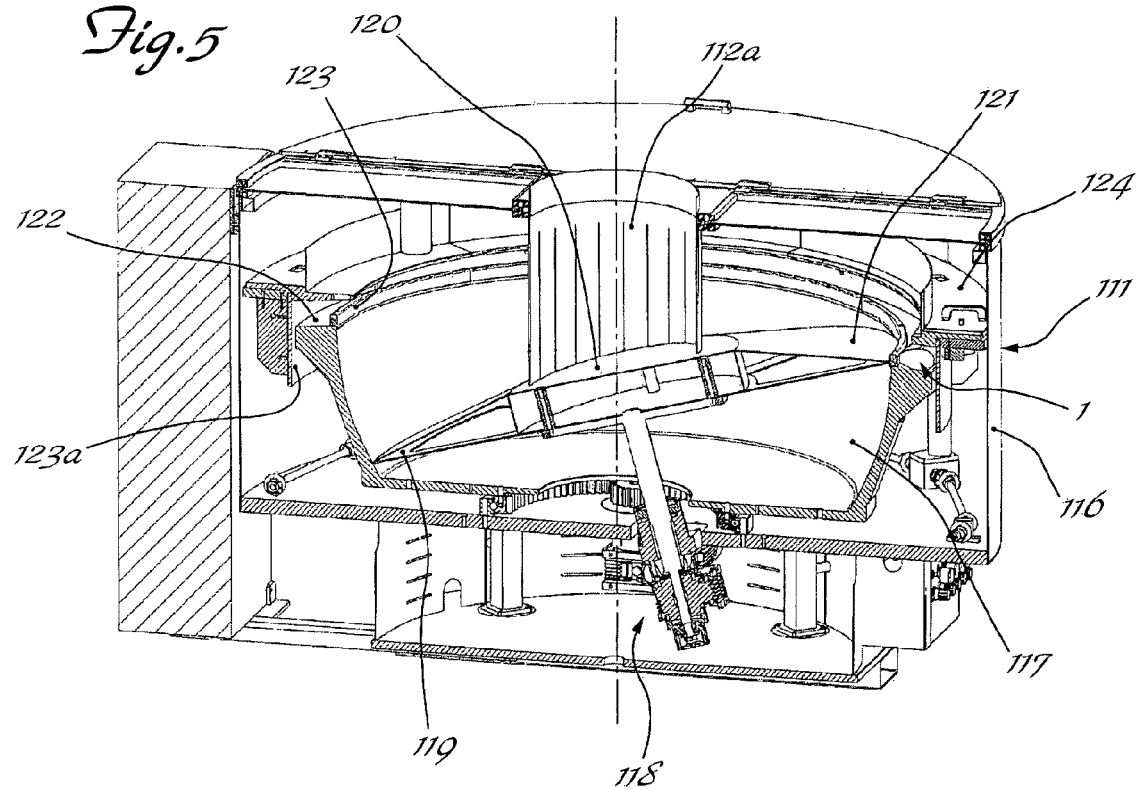
Figure 6:
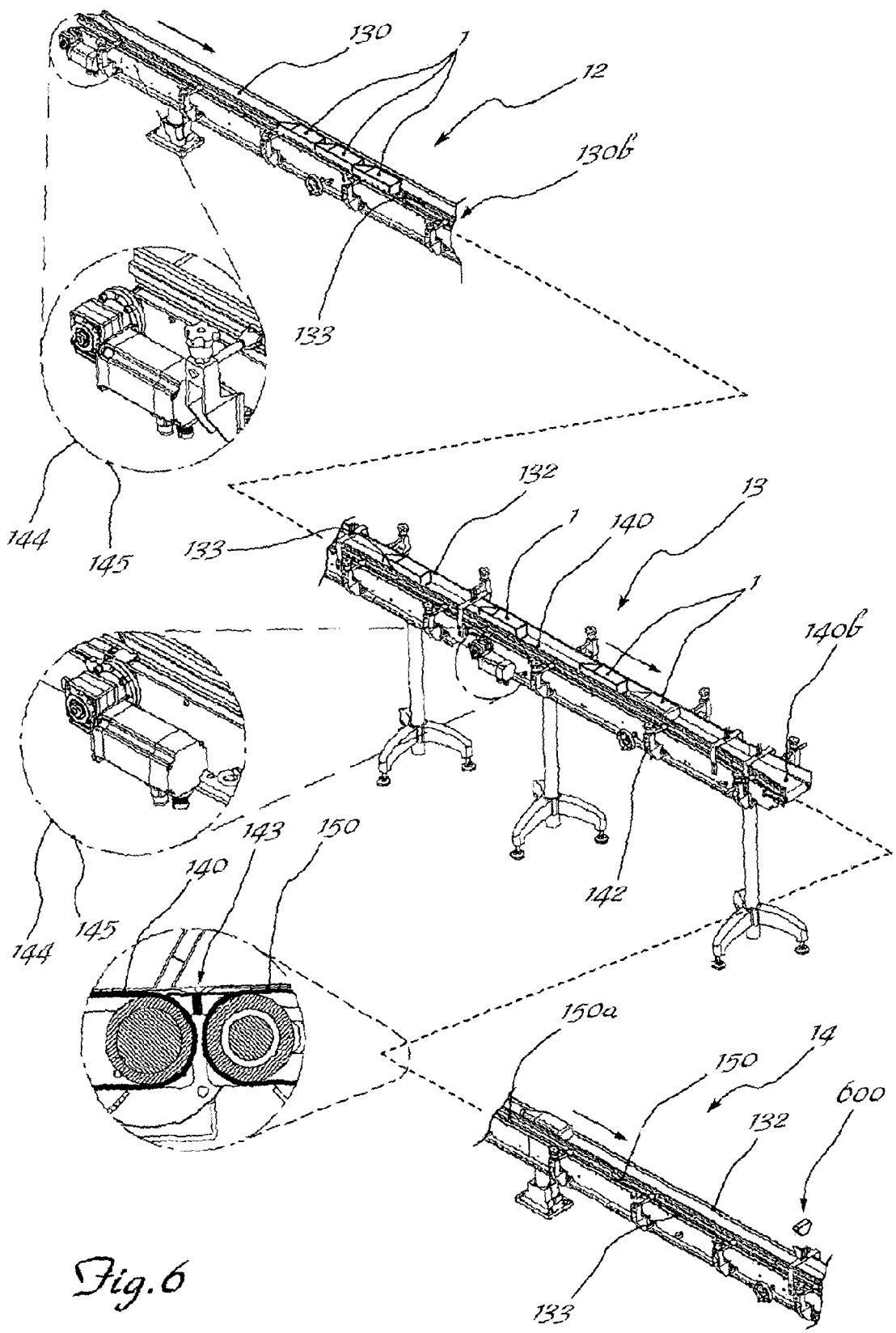
Figure 7:
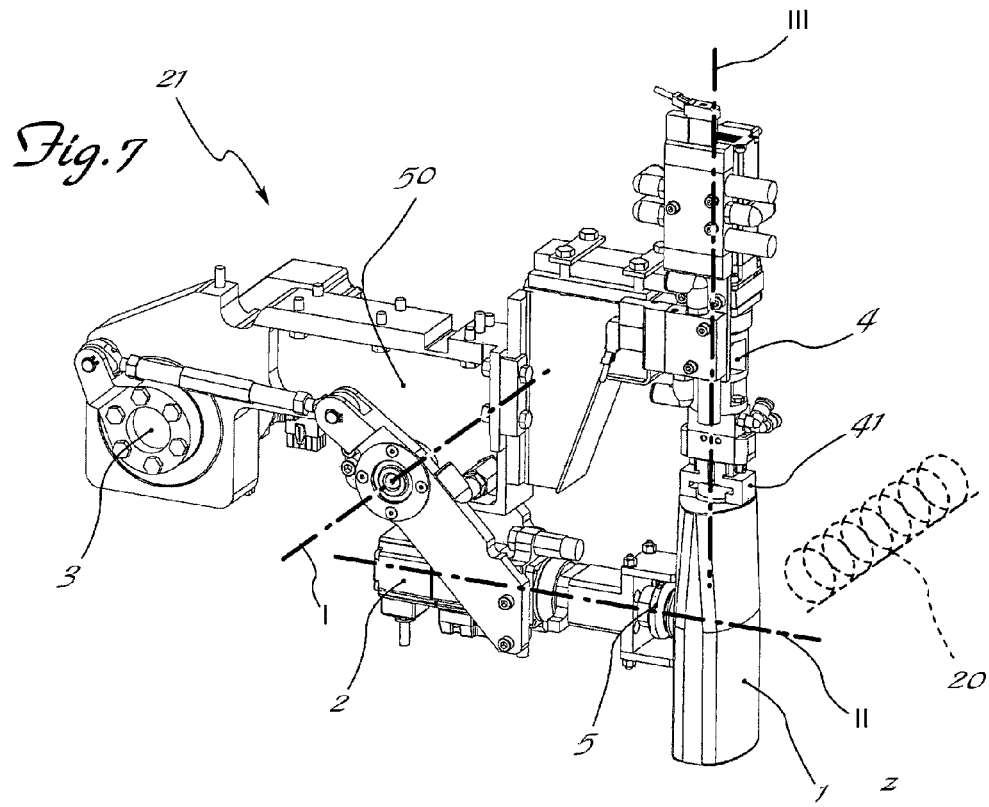
Figure 8:
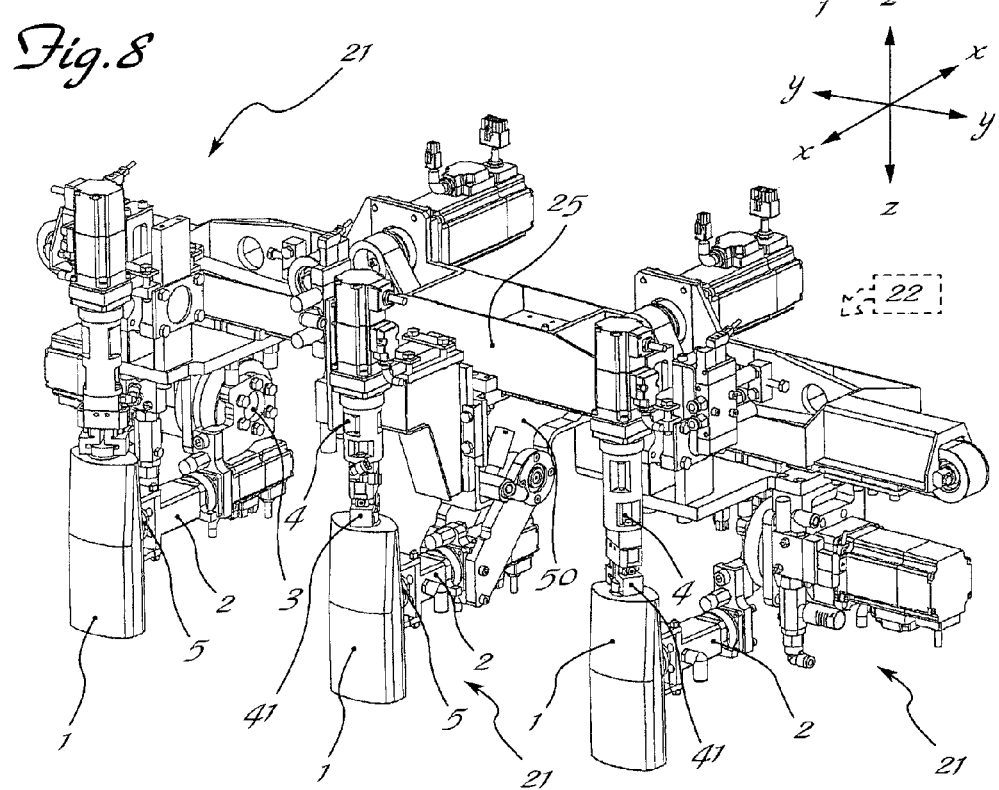
Figure 9:
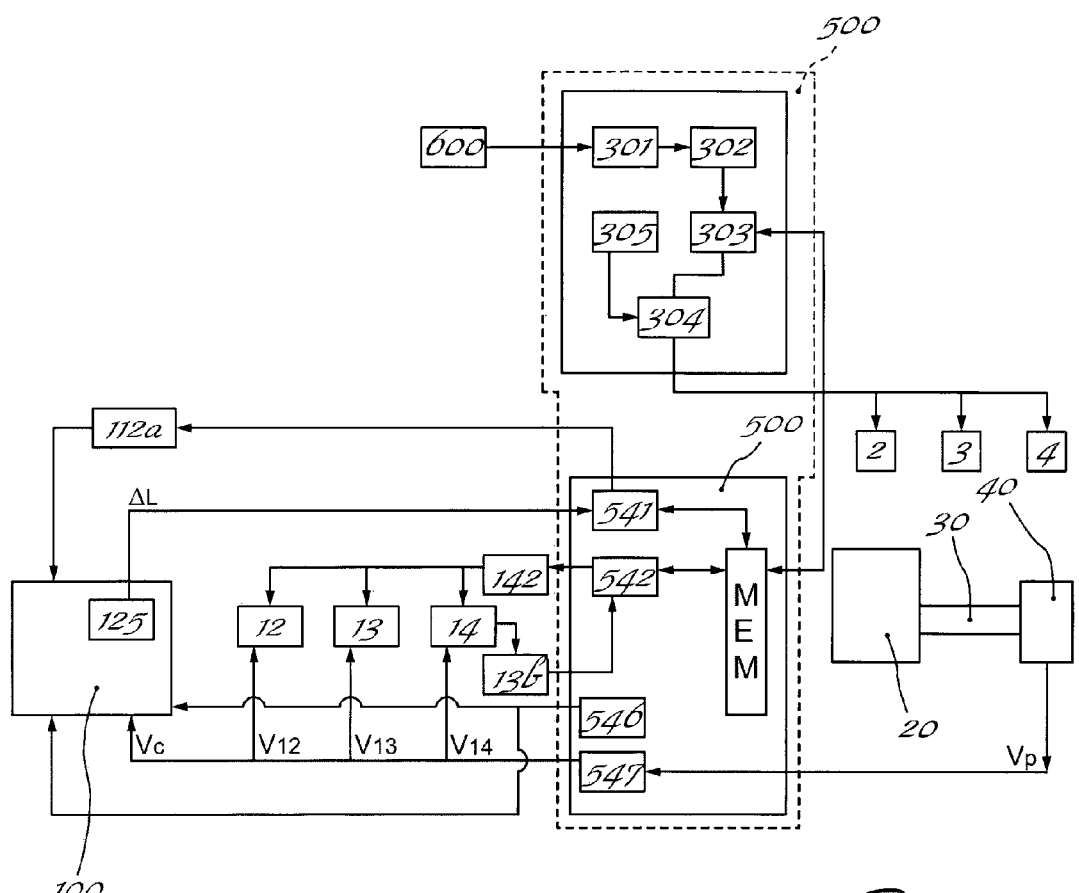
Figure 10:
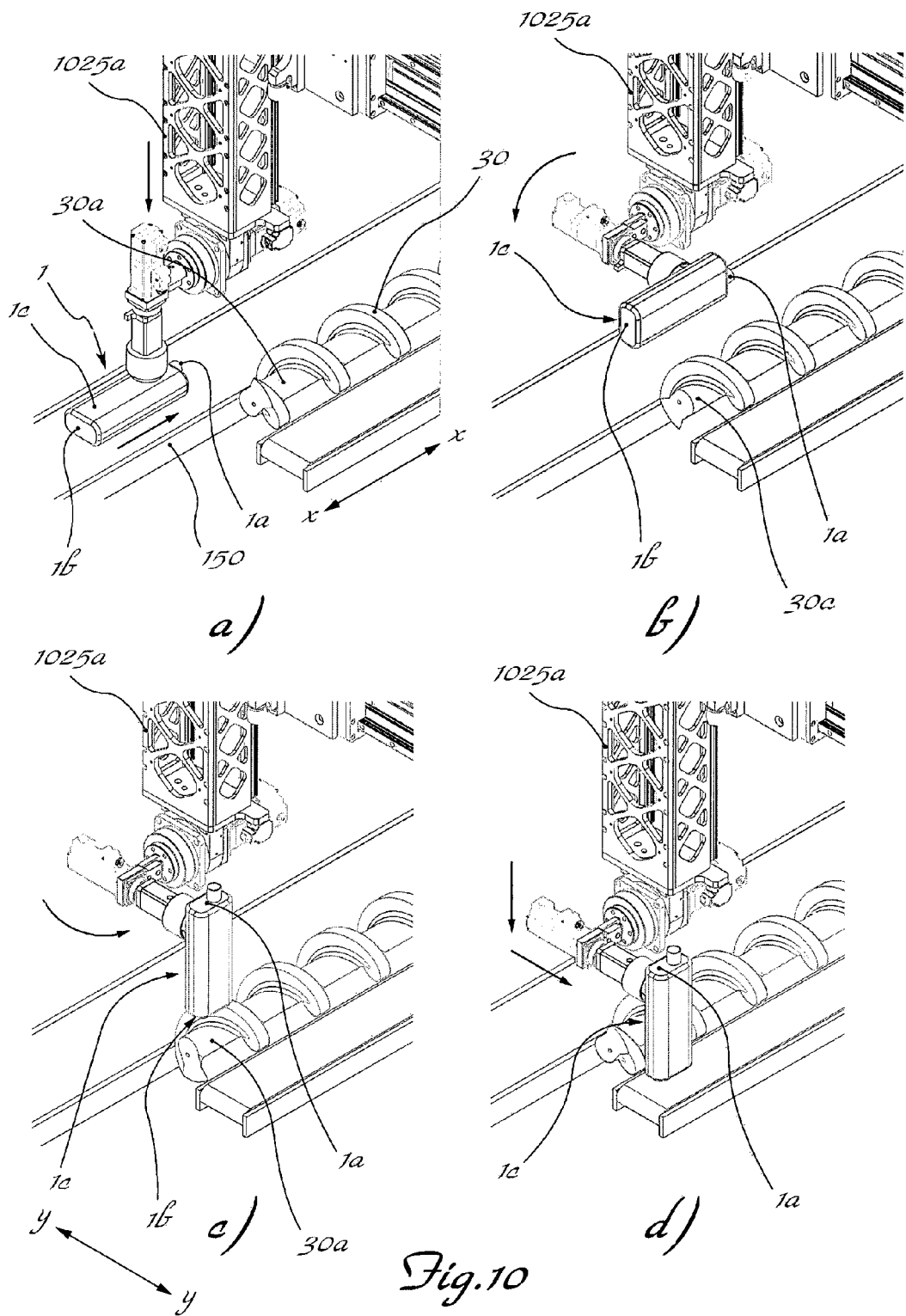
Figure 11:
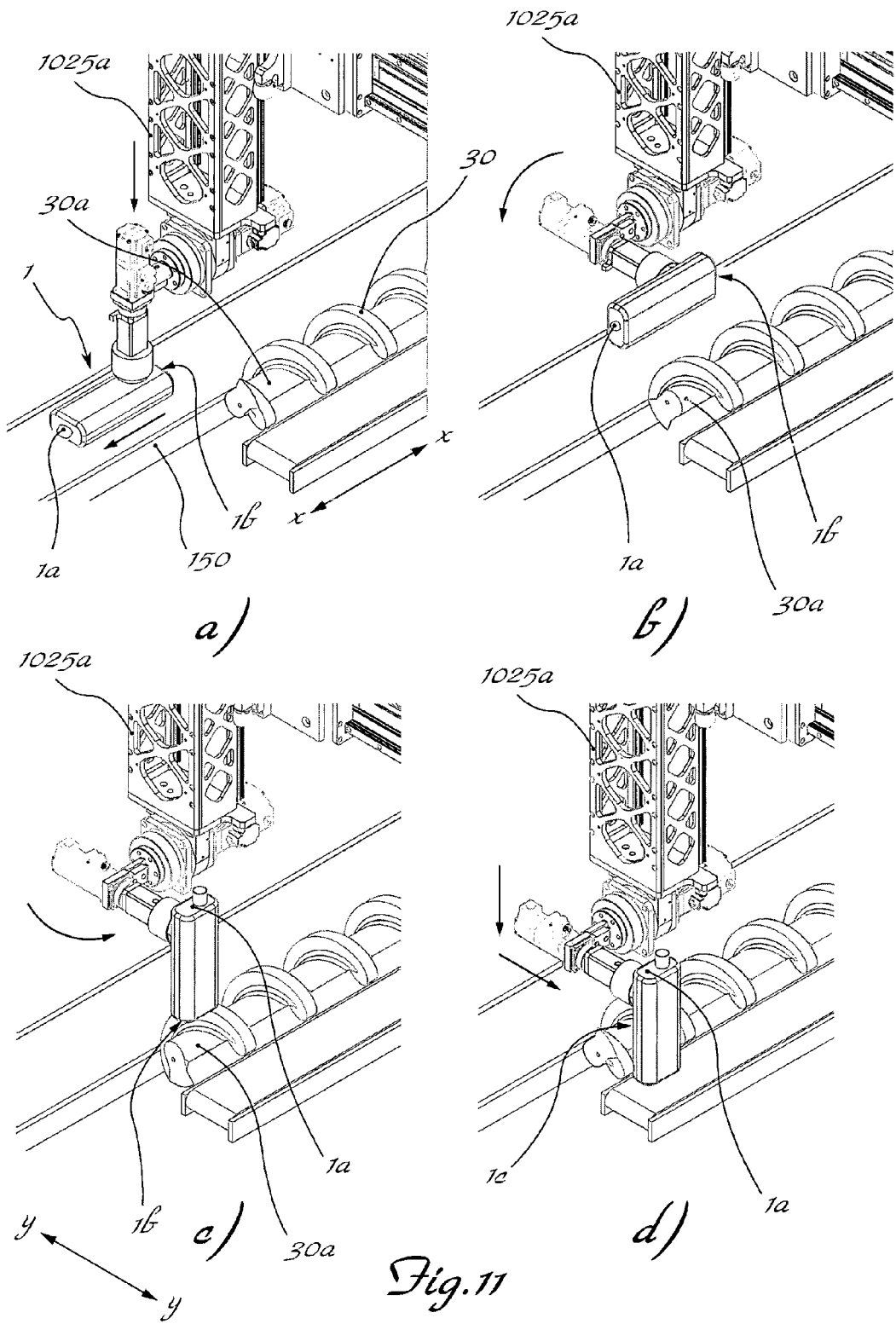

These and other advantages of the invention will emerge more clearly from the description provided hereinbelow, of an example of embodiment, provided by way of a non-limiting example, with reference to the accompanying drawings in which:

FIG. 1: shows a perspective view of the feeding and processing system according to the invention;

FIG. 2: shows a side view of the system according to FIG. 1;

FIG. 3: shows a view, from above, of the system according to FIG. 2;

FIG. 4: shows a perspective view of the realignment centrifuge;

FIG. 5: shows a cross-section along a diametral vertical plane of the centrifuge according to FIG. 4;

FIG. 6: shows a perspective view of the devices for moving the bottles leaving the centrifuge;

FIG. 7: shows a perspective view of the device for orienting the bottles according to FIG. 5;

FIG. 8: shows a perspective view of a first embodiment of an orientation machine comprising three orientation devices;

FIG. 9: shows a block diagram of the programming and control unit associated with the system;

FIG. 10: show schematic views of the working sequence of a second embodiment of an orientation machine with the bottle fed with its mouth directed downstream; and FIG. 11: show schematic views of the working sequence of the orientation machine according to FIG. 10 with the bottled fed with its mouth directed upstream.

DETAILED DESCRIPTION

With reference to the accompanying figures and assuming for the sole sake of convenience of description and without a limiting meaning a set of three reference axes in the longitudinal direction X-X, corresponding to the direction of advancing movement of the bottles on the conveyor devices, transverse direction Y-Y at right angles to the previous direction, and vertical direction Z-Z, as well as a part upstream with respect to the flow of the bottles, corresponding to the outlet from a realignment centrifuge, and a downstream part, opposite to the previous part, directed towards a processing station 20 arranged upstream of a filling machine 40, a system for feeding and processing bottles 1, which have a mouth 1a and a base 1b and are arranged randomly in a store at the start of the line, comprises a feed station with a feed apparatus 10 which feeds bottles 1 to a station 20 for processing/handling bottles 1, which orients the bottles correctly, depositing them on devices 30, normally in the form of a screw feeder, for entry into the filling machine 40 which operates at a predefined operating speed Vp. According to the present invention it is envisaged that the feed station 10 comprises essentially;

a realignment centrifuge 100 comprising a container 111, which is fed internally with the bottles 1 in a random manner and has an outlet mouth 113 from where the bottles 1 emerge in an ordered manner in the longitudinal direction X-X and arranged horizontally, i.e. with their longitudinal axis parallel to the longitudinal axis of advancing movement of the conveyor devices arranged downstream of the realignment centrifuge.

According to preferred embodiments it is envisaged that the container 111 has a cylindrical shape and that the bottles 1 are fed, for example, by means of raising devices 112 which are associated with an inlet channel in the form of a hopper 112a and which are conventional per se and therefore only schematically shown in FIG. 1.

The centrifuge 100 also comprises (FIGS. 4 and 5) a containing bowl 117 and a drive system 118 (FIG. 4) designed to move the various parts of the centrifuge so that rotation of the bowl 117 and a disc-shaped element 119 situated inside it produces a movement of the bottles 1 such as cause them to move back up towards the annular edge 122 against which they are forced in the vertical direction by means of interference with the section of a circular rim 124, thus being arranged horizontally, i.e. with their axis corresponding to the large dimension parallel to the plane of the longitudinal axis of the apparatus, being arranged aligned on the edge 122 and substantially in contact with each other, albeit with a random mouth 1a/base 1b orientation.

The rotation of the bowl 117 and the disc-shaped element 119 keeps the bottles 1, aligned on the edge 122, pushed towards the outlet mouth 113 from where they exit, in the horizontal position, in a continuous line without gaps due to a missing bottle, said gaps being prevented by the particular structure of the centrifuge which, feeding the containers in the horizontal position, is not conditioned by the correct entry of the bottles into vertical pockets as occurs in the prior art.

The speed of rotation of the bowl 117 and the disc-shaped element 119 also determines the speed of the centrifuge 100 in terms of bottles exiting per unit of time, said speed being dependent on and related to the operating speed Vp of the filling machine 40 arranged downstream and in series with the devices for handling and conveying the bottles towards the said filling station.

In particular, having defined Vp as the production speed of the line and Vc as the speed of rotation of the centrifuge expressed in meters/minute, it is required that Vc=Vp*Kc where Kc>1 so that the output speed of the bottles from the centrifuge is always greater than the speed of the filling machine.

The feed station according to the invention envisages that, downstream of the centrifuge 100, devices are arranged for moving the bottles 1 in a horizontal position from the outlet mouth 113 of the said centrifuge 100; in detail said devices for moving the bottles 1 comprise:

A first movement device 12 designed to move at a first speed V12=Vc*K12 with K12<1, namely with a speed less than the speed of rotation of the bowl 117 and the disc-shaped element 119 and therefore with a speed less than the output speed of the bottles from the centrifuge 100.

Preferably, the first movement device 12 comprises a conveyor belt 130, called an "accumulation belt", made of material with a low coefficient of friction so that each bottle is able to travel on the belt pushed by the next bottle and vary its relative position with respect to the bottle in front of it, so as to allow recovery of any relative spaces formed between bottles and ensure that a succession of containers exit at the downstream end 130b of the belt all in the horizontal position and always in contact with each other.

A second movement device 13 which is designed to receive the bottles 1 supplied by the first movement device 12 and compensate for any discontinuity of said bottles.

The second device 13 is designed to move at a second speed V13=V12*K13 where K13≤1; this means that the second speed V13 of the second movement device 13 is less than or the same as the speed V12 of the first movement device 12, acting substantially as a brake; this ensures that the bottles always remain in a compact arrangement on the belt and that no "voids" are formed between them. Preferably, this second movement device 13 comprises a conveyor belt 140, called a "synchronization belt", made of material with a high coefficient of friction. The high degree of friction ensures that any disturbances affecting the centrifuge (knocks or jolts due to transients during feeding) do not cause the chain of bottles to slide forwards in an uncontrolled manner.

A third device 14 preferably comprising a conveyor belt 150, called loading belt, which receives the bottles from the second device 13 and conveys them inside the processing/handling unit 20 from where they are then removed and inserted into the screw feeder 30.

This belt 150 moves at a speed V14 greater than the speed V13 of the second belt 140 and synchronized with that of the bottle allocation screw feeder, depending on the speed Vp of the filling machine, so as to introduce a predefined relative spacing in the longitudinal direction of advancing movement of the bottles when they pass from the second belt to the third belt.

Although described in connection with a preferred example of embodiment which envisages the simultaneous presence of three movement devices, it is envisaged that solely the first device 12 arranged at the outlet of the centrifuge 100 and the third device 14 arranged downstream of the first device and moved at a speed V14 greater than the speed V13 of the first device, are essential for operation of the apparatus.

Preferably, a fixed base-piece 143 is arranged between the second conveyor belt 140 and the third conveyor belt 150 at the respective facing output/input ends 140b, 150a thereof.

The fixed base-piece 143 forms a stable connection between the second belt 140 and the third belt 150, ensuring safe passage of the bottles 1 from the second belt to the third belt and preventing any risk of sliding or falling from the production line.

As shown in FIGS. 5, 6 and 7 it is envisaged that in a preferred embodiment the conveying devices 12, 13, 12 comprise a pair of shoulders 132, 133 arranged on the two longitudinal sides of the said conveyor belts and displaceable relative to each other in the transverse direction Y-Y with respect to the transverse dimension of the bottles 1 in transit.

Advantageously, according to the invention, these shoulders 132, 133 ensure that alignment of the bottles 1 from the centrifuge 100 is maintained, therefore keeping these bottles in a position ideal for subsequent handling in order to perform orientation thereof.

Preferably, said shoulders are connected to a regulating handwheel 132a able to operate a mechanism 132b for example of the rack and pinion type connected to at least one of the two shoulders so as to displace mechanically at least one of the two shoulders 132, 133 relative to each other.

Setting of the relative distance between two shoulders is performed by an operator who adjusts the aforementioned handwheel depending on the geometric characteristics of the bottles in the batch being processed.

It is possible to envisage replacing said shoulders with suitable thick belts having milled zones along the axis of movement so as to seat the bottles and keep them in position.

In a preferred embodiment of the apparatus according to the invention it is also envisaged that means 600 for detecting the orientation of the horizontally lying bottle 1 are arranged along the path of the third conveyor device 14; these means 600 may, for example, comprise a telecamera which is arranged above the third belt 150 and which, directed at the bottle 1, detects whether its mouth 1a is arranged downstream or upstream in the direction of advancing movement X-X, generating a corresponding different signal for each case.

It is also envisaged that the telecamera 600 may also detect:
any angular misalignment of the bottle with respect to the axis of advancing movement X-X of the belt 150;
any slight advance or delay in the position of the bottle on the belt 150 with respect to a preset position,
generating corresponding signals.

All the signals emitted by the telecamera 600 are sent to a control unit 500, described below, associated with the system; said unit can then send this signal to the processing/handling station 20 arranged downstream of the feed apparatus so that said station can correctly handle the bottle so that it is always made to assume the same condition with the mouth open upwards whatever the position in which it arrives at the said station 20.

The station 20 for processing/handling the bottles 1 is located downstream of the feed station 10, said station 20, after picking up the bottles from the third conveyor belt 150, correctly orienting them and depositing them inside a respective seat of the screw feeder 30 for entry into the filling machine 40.

The processing station 20 in turn comprises an orientation device 21 (FIG. 7) for orienting the bottles 1 leaving said orientation station, which comprises:

a first actuator 2, provided with gripping means 5, for gripping a bottle 1 and designed to rotate in both directions, i.e. clockwise and anti-clockwise, about a respective first axis of rotation I parallel to the longitudinal direction X-X of advancing movement of the bottles; expressed in other words, this axis is parallel to the plane in which the conveyor belt 150 for the bottles 1 lies and therefore also to the longitudinal axis of the bottles 1 arranged horizontally on the conveyor belt 150.

Preferably, the gripping means 5 consist of a suction cup, which may be associated with suction means and which offers the advantage of being able to adhere to surfaces which are perfectly flat, for example with a concave or convex curvature and in some cases with an irregular shape, such as those typical of the bottles 1.

a second actuator 3, which is kinematically connected to the first actuator 2 and is designed to cause rotation of the first actuator 2 in both directions, i.e. clockwise or anti-clockwise, about an axis of rotation II (FIG. 7) perpendicular to the first axis of rotation; in other words, the second axis of rotation is at right angles to the longitudinal direction of travel of the conveyor belt 130, 140, 150.

In a first embodiment, the orientation device 21 comprises a third actuator 4 designed to rotate the bottle 1, in both the clockwise and anti-clockwise directions, about a third axis of rotation III parallel to the vertical direction Z-Z (FIG. 7), namely perpendicular to the second axis of rotation and to the first axis of rotation. In other words, the third actuator 4 is designed to rotate the bottle 1 about its longitudinal axis, after being positioned in an erect position by the second actuator 3.

In this case, the third axis of rotation III coincides with the longitudinal axis of the bottle 1.

The third actuator 4 is provided with gripping means 41 for gripping the bottle 1. Gripping is performed around the inlet mouth of the bottle 1.

The use of a gripper such as the gripping means 41 is particularly convenient for the bottles 1, being particularly suitable for gripping a bottle around a neck portion.

The processing station 20 also comprises means 25 for supporting the devices 21, said support means 25 being such as to maintain the possibility of rotation of each actuator about its axes of rotation and perform translatory movements parallel to the direction Y-Y transverse to the longitudinal direction of advancing movement of the bottles and to the vertical direction Z-Z.

In a first embodiment the support means consist of a cross-beam 25 which carries at least two orientation devices 21 slidably associated with the said cross-beam by sliding means conventional per se and therefore not shown in detail.

In the example of embodiment shown in FIG. 8, three orientation devices 21 are mounted on a cross-beam 25, one being mounted fixed in a central position on the cross-beam and the other two orientation devices 21 being mounted on the opposite side, in positions adjacent to the first one.

In a further embodiment (FIGS. 2, 3) the support means are formed by means of a frame 1025 lying in a plane parallel to the plane of the longitudinal axis X-X and transverse axis Y-Y and having uprights 1025a (FIG. 10) to which the actuators 2, 3, 4 are fixed; the frame 1025 is displaceable in both directions along said longitudinal axis X-X and transverse axis Y-Y and also along the vertical axis Z-Z.

In both cases, i.e. that of the beam-type support 25 or that of the frame-type support 1025, each actuator 2, 3, 4 has five degrees of freedom, being able to perform rotations in both directions about the respective axes I, II, III and displacements, via the support 25, 1025, along the three directions of movement. It is also envisaged that the device 22 for positioning the oriented containers comprises an anthropomorphic robot.

According to the invention it is in fact envisaged that the apparatus is associated with a programming and control unit 500 (FIG. 9) which manages the various moving parts, receiving information from suitably positioned sensors, and compares the detected values with values which are programmed and stored in a memory module MEM and sends command signals to the various actuators for the movements and/or for adjusting variable parameters.

Preferably, the control unit 500 comprises a first operating module 541 configured to active supplying of the bottles 1 to the bowl 117 of the centrifuge 100, acting on the basis of a signal ΔL representing the variation in level of the bottles 1 inside the bowl 117 and emitted by a sensor 125 mounted inside the bowl and designed to detect the level of the bottles 1 actually present inside the latter.

In particular, when the level ΔL detected is less than a predefined level stored in MEM, the first operating module 541 activates supplying of the bottles 1 to the bowl 117 by means of the hopper 112a.

It is however envisaged that, alternatively, activation and deactivation of loading of the bottles 1 may be timed independently of the level ΔL of the bottles inside the containing bowl 117.

The control unit 500 also comprises a second operating module 546 which is configured to set the distance between the flat edge 122 of the bowl 117 and the annular segment 124.

In other words, the operating module 546 is configured to calculate a value of the aforementioned distance depending on the corresponding dimension of the bottle to be processed and to generate a corresponding signal to be transmitted to a suitable actuator acting on the circular segment 124.

In addition to control of feeding to the realignment centrifuge, the control unit 500 envisages an operating module 542 which is configured to operate an actuator able to displace mechanically at least one of the two shoulders 132, 133 of the conveyor belts 130, 140, 150.

In particular, a distance sensor 136, configured to detect the relative distance existing between the displaceable shoulders 132, 133, is positioned along said conveyor belts 130, 140, 150 and, detecting said relative distance between the shoulders, sends a corresponding signal to an operating module 542 of the control unit 500.

When the control unit 500 receives the value detected by the distance sensor 136, the module 542 compares said value with the distance value stored in MEM in relation to the current batch of bottles and, depending on the difference calculated, emits corresponding signals for operating an actuator 142, which activates the mechanism so to cause the displacement of at least one of the two shoulders 132, 133 on the basis of the values received.

The control unit 500 is configured to set also the values of the speed Vc of rotation of the centrifuge 100 and the speeds V12, V13, V14 of the devices 12, 13, 14 for conveying the bottles from the outlet of the centrifuge 100 to the outlet of the said conveyors.

For this purpose, the control unit 500 comprises an operating module 547 which, on the basis of a production speed Vp envisaged for a filling machine 40 in series with the feed unit, calculates the speeds Vc, V12, V13, V14 in accordance with the following relations:

$$Vc > Vp$$

$$V12 = Vc/K12 \ (K12 > 1)$$

$$V13 = V12 * K13 \ (K13 \leq 1)$$

$$V14 = V13 * K14 \ (K14 > 1)$$

where Vc and Vp are expressed in products per minute and K13 is a dimensionless factor with an absolute value less than one so that the speed of the centrifuge is always greater than the production speed of the line in view of the fact that the centrifuge has a value for processing of the products per unit of time, which is statistical and non-deterministic, while K14 has a value greater than one so that the speed of the third belt is always greater than the speed of the first belt and the second belt.

With these relations between the speeds of the belts the control unit 500 causes the belt 130 to move at a speed adjusted by a factor K13 with respect to the speed of the centrifuge so that the bottles are compacted in the longitudinal direction.

The speed of the third belt 150 is also continuously modulated so that the bottles are suitably spaced within a predefined tolerance margin which is then detected by the telecamera and compensated for by the handling device.

A photocell associated with the belt 150 allows the distances of the bottles to be detected and the speed V14 to be modulated.

Preferably the movement of this device is performed by means of a spacing motor 145 (FIG. 5) which may be operated by the control unit 500.

The third belt 150 is driven by the control unit so that it is always synchronized with respect to the speed of the screw feeder for the bottle end application, this meaning that in terms of bottles per minute the two systems must be always aligned.

In general, it must be noted that in the present context and in the following claims the control unit 500 will be presented as divided into memory modules and operating modules which are separate for the sole purpose of describing in a clear and complete manner the functions of the said units.

In reality these functions may be performed by a single electronic device, which has been suitably programmed, and the various modules may correspond to hardware items and/or software routines forming part of the programmed device. Alternatively or in addition, these functions may be performed by a plurality of electronic devices among which the modules may be distributed.

The devices involved may also make use of one or more microprocessors in order to carry out the instructions contained in the memory or memories MEM. Furthermore, the memory and operating modules may be distributed among different local or remote computers based on the architecture of the network in which they reside.

The control unit 30 comprises a localization module 301 designed to detect the initial position of the bottles 1 and associated with one or more orientation devices 21.

This localization device 301 receives the signals emitted by the telecamera 600 for optically detecting orientation of the bottles 1.

The control unit 302 is connected to a localization module 301 for receiving at its input the initial position detected of the bottles 1.

Advantageously, the control module 302 comprises a comparison module 303 configured to compare the initial position of the bottle 1, detected by the localization unit 310, with predefined end positions into which the bottles 1 are to be brought and which are stored in MEM.

The control unit 302 also comprises a calculation module 304 which is configured to calculate, on the basis of the outcome of the abovementioned comparison, the amplitude of the rotations of the first, second and third actuators so as to move the bottle 1 from the initial position into the predefined final position.

In other words, the calculation module 304 is configured to calculate an amplitude of rotation of the first, second and third actuator depending on the value of a signal representing the result calculated by the comparison module 303.

In this way, the control unit 302, starting from the initial position of the bottles 1 detected by the localization unit 301, is able to actuate the orientation devices 21 so that the bottles 1 are brought into the desired end position irrespective as to the initial position of the bottles 1.

The relative position of the devices 21 may be adjusted in a given manner depending on the form characteristics of the devices to be moved.

Alternatively, this position may be adjusted in real time.

In particular, the localization module 301 is configured to locate the bottles, detecting also the distances between them.

The control module 302 comprises a positioning module 305 which is configured to calculate, based on the data detected by the localization unit 301, the relative distances which must be maintained between the various orientation devices 21 to allow correct gripping of the bottles 1.

In other words, the positioning module 305 is configured to calculate, based on the data detected by the localization unit 301, the relative distances which must be maintained between the various orientation devices 21 on the support 25 and to activate an actuator for movement of the orientation devices 21 on the cross-beam 25 using the distances calculated.

Similarly the module 305 is able to activate the actuators for performing the movements of the frame 1025.

In other words, the positioning module 305 is able to prevent the various bottles 1 from interfering with each other during the respective movements.

The processing station 20 also comprises a positioning device 22 for moving the machine 25, 1025 and positioning the bottles 1 entering the filling station 40.

In particular, this device 22 is configured to position the cross-beam 25 or the frame 1025, together with the orientation devices 21 associated with it, so that the bottles 1 are correctly positioned in a screw feeder supplying the filling station 40. In particular, the orientation devices 21 are spaced depending on the distance between the bottles 1 and the speed of feeding of the bottles to the processing station 20.

As shown in FIGS. 10 and 11 with reference to the support 1025, the bottle travelling horizontally on the belt 150 and arriving in the zone of action of the orientation device 21 may be oriented front-endwise or back-endwise.

The expression (bottle oriented) "front-endwise" is understood as meaning a bottle 1 which is oriented so as to have its mouth 1*a* in a position further downstream than its base 1*b* in the direction of advancing movement along the belts 130, 140, 150.

In addition, the bottles may have one surface 1*c* of its side surfaces which is to be considered preferential with respect to the other surface, having to enter with a precise orientation into the filling machine 40, for example so as to allow correct labelling once filling has been completed.

In all cases, the telecamera 600 and the proximity sensor have informed the control unit 500 which, by means of the respective modules 301-304, controls the support 25 or 1025 as follows:
- displacement of the support 1025 in the longitudinal direction X-X so as to bring the device 21 into the correct position for gripping the bottle;
- downward movement of the support 25, 1025 in the vertical direction Z-Z until the container is retained on the first actuator 2 by the gripping means 5.

At this point:
if the bottle arrives back-endwise (FIG. 10*a*)
a1) the second actuator 3 causes the first actuator 2 to perform a first rotation through 90° in an anti-clockwise direction about the first axis of rotation I so as to bring the bottle in a raised position with respect to the 150, but still horizontally arranged;
a2) the first actuator 2 performs a rotation through 90° in an anti-clockwise direction about the second axis of rotation II so as to bring the bottle into an erect position with its mouth directed upwards (FIG. 10*b*);
a3) if required, the third actuator 5 causes the bottle 1 to perform a rotation in either direction about its longitudinal axis arranged parallel to the vertical axis Z-Z so as to bring the side surface 1*c* into the correct front or rear position;
b3) alternatively, correct orientation of the side surface 1*c* may be obtained during first rotation of the second actuator 3 about the first axis of rotation 1, by imparting a clockwise or anti-clockwise direction of rotation which brings the side surface 1*c*, for example, always into the front position as in the example shown;
a4) the support 25, or the frame 1025, moves in the transverse direction Y-Y towards the screw feeder 30, recovering any height lost/gained by the first rotation in a clockwise/anti-clockwise direction of the first actuator 2;
a5) the support 25, 1025 moves downwards in the vertical direction Z-Z so as to deposit the bottle in the seat 30*a* of the screw feeder 30, being raised again after depositing the bottle;
a6) the support 25, 1025 returns into the start of cycle position for picking up another bottle 1 in arrival.

If the bottle arrives back-endwise (FIG. 11*a*)
a1) the second actuator 3 causes the first actuator 2 to perform a first rotation through 90° in an anti-clockwise direction about the second axis of rotation so as to bring the bottle 1 in a raised position with respect to the belt 150, but still horizontally arranged;
a2) the first actuator 2 causes the bottle 1 to perform a rotation through 90° in a clockwise direction about the second axis of rotation so as to bring the bottle into an erect position with the mouth directed upwards (FIG. 11*c*);
a3) if required, the third actuator 5 causes the bottle 1 to perform a rotation in either direction about its longitudinal axis arranged parallel to the vertical axis Z-Z so as to bring the side surface 1*c* into the correct front or rear position;
b3) alternatively, correct orientation of the side surface 1*c* may be obtained during first rotation of the second actuator 3 about the longitudinal axis of rotation X-X, by imparting a clockwise or anti-clockwise direction of rotation which brings the side surface 1*c*, for example, always into the front position as in the example shown;
a4) the support 25, or the frame 1025, move in the transverse direction Y-Y towards the screw feeder 30, recovering any height lost/gained during the first rotation in a clockwise/anti-clockwise direction of the first actuator 2;
a5) the support 25, 1025 moves downwards in the vertical direction Z-Z so as to deposit the bottle in the seat 30*a* of the screw feeder 30, being raised again after depositing the bottle;

a6) the support 25, 1025 returns into the start of cycle position for picking up another bottle 1 in arrival.

The positioning device 21 and the support 25 or 1025 act in any case so that each bottle 1 held by respective gripping means 41 is always positioned in a corresponding seat of the screw feeder correctly oriented with the mouth 1a directed upwards and, if required, with the side surface 1c directed towards the front.

The present invention relates further to a method for feeding and processing bottles to be conveyed to means 30 for entry into a filling station 40 operating at a speed Vp, which comprises the steps of:

feeding bottles 1 to a centrifuge 100;
extraction, from the centrifuge, of bottles arranged horizontally and aligned in a longitudinal direction of advancing movement;
setting a speed Vc for extraction of the bottles from the centrifuge greater than the speed Vp of the filling machine;
entry of the horizontally arranged bottles leaving the centrifuge 100 onto a first movement device 12;
movement of the bottles 1 in a longitudinal direction X-X of advancing movement and at a first speed V12 less then the speed Vc at which they leave the centrifuge;
preferably transfer of the bottles 1 leaving the first movement device onto a second movement device 13;
operation of the second movement device 13 at a second speed V13 less than or the same as the first speed V12;
transfer of the bottles 1 from the second feed device to a third feed device 14;
in any case movement of the third feed device 14 at a speed V14 greater than the speed V12 of the speed of the first movement device and synchronized with the speed Vp of the filling machine;
picking up of the bottle in arrival by a handling device 21;
first rotation through 90° of the handling device in a clockwise/anti-clockwise direction, depending on any need for preferential orientation of one of the side surfaces 1c of the bottle about a respective first axis of rotation I parallel to the longitudinal direction X-X of advancing movement of the bottles;
second rotation through 90° of the handling device 21 in a clockwise/anti-clockwise direction depending on whether the bottle 1 is oriented front-endwise or back-endwise, about a respective second axis of rotation II at right angles to the longitudinal direction X-X of advancing movement of the bottles so as to bring the bottle into an erect position with its mouth directed upwards (FIG. 10b);
displacement of a support 25; 1025 of the handling device 21 in the transverse direction Y-Y towards the screw feeder 30 with recovery of any height lost/gained by the first rotation in a clockwise/anti-clockwise direction of the handling device 21;
downwards displacement in the vertical direction Z-Z of the support 25; 1025 and deposition of the bottle 1 in the seat 30a of the screw feeder 30;
upwards displacement in the vertical direction Z-Z of the support 25; 1025;
return of the handling device 21 into the start-of-cycle position.

It is therefore clear how the feeding and processing system according to the invention is able to ensure:

optimum efficiency due to the fact that basically 100% efficiency is guaranteed at the centrifuge outlet which does not create "voids" in the line of bottles being output towards the movement devices and therefore 100% filling of the screw feeder for entry into the filling machine;
a high degree of flexibility in the event of a variation in the geometric characteristics of the bottles, it no longer being required to carry out complicated format change-over operations of the centrifuge, this also resulting in a significant reduction in the production downtime of the entire line;
also being structurally more simple, more compact and more flexible, while ensuring an optimum filling efficiency even in the absence of a queuing station, as well as overall lower costs.

The invention claimed is:

1. A system for feeding and processing/handling bottles (1) to be conveyed to a device (30) for entry into a filling machine (40):

a realignment centrifuge (100) fed randomly with the bottles (1) operating at a speed (Vc) greater than an assigned speed (Vp) of reference and having a tangential outlet (113) extending in a longitudinal direction (X-X) of advancing movement of the bottles (1);
movement devices (12, 13, 14) extending in the same longitudinal direction (X-X) of advancing movement, arranged downstream of said realignment centrifuge (100) and able to convey the bottles (1) leaving the realignment centrifuge (100) and vary the speed of advancing movement thereof;
at least one bottle handling device (21);
wherein
the bottles (1) leaving the realignment centrifuge (100) lie horizontally in the longitudinal direction (X-X) of advancing movement, and
said movement devices (12, 13) comprise at least
a first device (12) operated at a first speed (V12) less than the speed (Vc) of the realignment centrifuge (100);
wherein the movement devices further comprises:
a second device (13) arranged downstream of the first device (12) and operated with a speed (V13) less than or the same as the speed (V12) of the first movement device;
a third device (14) operated at a speed (V14) greater than the speed (V12) of the first movement device, depending on and synchronized with the assigned speed (Vp)
said handling device (21) has a first actuator (2), provided with gripping means (5), for gripping a bottle (1) and designed to rotate in both directions, i.e. clockwise and anti-clockwise, about a respective first axis of rotation (I) parallel to the longitudinal direction (X-X) of advancing movement of the bottles;
a second actuator (3), which is kinematically connected to the first actuator (2) and is designed to cause rotation of the first actuator (2) in both directions, i.e. clockwise or anti-clockwise, about a second axis of rotation II perpendicular to the first axis of rotation (I).

2. The system according to claim 1, wherein said movement devices (12,13,14) comprise a respective conveyor belt (130,140,150) forming a closed loop in the longitudinal direction (X-X) of advancing movement of the bottles (1).

3. The system according to claim 2, wherein it comprises a fixed base-piece (143) arranged between the first conveyor belt (130) or the second conveyor belt (140) and the third conveyor belt (150).

4. The system according to claim 3, wherein said conveyor belts (130, 140, 150) comprise a pair of side shoulders (132, 133) extending in the longitudinal direction (X-X) of advancing movement and displaceable relative to each other in the transverse direction (Y-Y).

5. The system according to claim 4, wherein said side shoulders (132, 133) are operated by means of a mechanism operated by a handwheel (132a).

6. The system according to claim 1, wherein it comprises detection means (600) associated with the devices for the advancing movement and able to detect the downstream or upstream orientation of the mouth (1a) of the horizontally arranged bottle (1) advancing in the longitudinal direction (X-X) and emit a corresponding different signal.

7. The system according to claim 6, wherein said detection means (600) comprise a telecamera (600) associated with the third movement device (14).

8. The system according to claim 1, wherein said orientation device (21) comprises a third actuator (4) designed to rotate the bottle (1), in both directions, i.e. clockwise and anti-clockwise, about a third axis of rotation (III) parallel to the vertical direction (Z-Z), namely perpendicular to the second and to the third axis of rotation.

9. The system according to claim 1, wherein it comprises support means (25; 1025) on which at least one orientation device (21) is mounted and which are able to be displaced in both senses of the longitudinal direction of advancing movement, along the transverse axis (Y-Y) and vertical axis (Z-Z).

10. The system according to claim 1, wherein it comprises a programming and control unit (500) connected to detection sensors (125, 136) and to actuators for the movements and/or for adjusting variable parameters.

11. The system according to claim 10, wherein it comprises a sensor (125) mounted inside the realignment centrifuge (100) and able to detect the level of the bottles (1) actually present inside said centrifuge and emit a corresponding signal (ΔL) representing the variation in level of the bottles (1).

12. The system according to claim 10, wherein said control unit (500) comprises a first operating module (541) configured to activate supplying of the bottles (1) to the realignment centrifuge (100) depending on said signal (ΔL) representing the level detected.

13. The system according to claim 1, wherein said control unit (500) comprises an operating module (547) configured to receive a signal representing the production reference speed (Vp) operationally associated with the feed apparatus (10).

14. The system according to claim 13, wherein said operating module calculates the speeds (Vc) of the realignment centrifuge and the speeds (V12, V13, V14) of the movement devices (12, 13, 14) in accordance with the following relations:

$$Vc > Vp$$

$$V12 = Vc/K12 \ (K12 > 1)$$

$$V13 = V12 * K13 \ (K13 \leq 1)$$

$$V14 = V13 * K14 \ (K14 > 1)$$

where Vc and Vp are expressed in products/minute.

15. The system according to claim 1, wherein it comprises a distance sensor (136) able to detect the relative distance existing between the displaceable shoulders (132, 133) and send a corresponding signal to the control unit (500).

16. The system according to claim 1, wherein the control unit comprises an operating module (542) which, upon receiving the value detected by the distance sensor (136), emits corresponding signals for operating an actuator (142) which activates the mechanism so as to cause the displacement of at least one of the two shoulders (132, 133).

17. The system according to claim 1, wherein it comprises a localization module (301) designed to detect the initial position of the bottles (1) and associated with at least one orientation device (21).

18. The system according to claim 16, wherein said localization module (301) receives the signals emitted by the telecamera (600) for optically detecting the orientation of the bottles (1).

19. The system according to claim 18, wherein said localization module (301) is connected to a control module (302) which comprises a comparison module (303) configured to compare the initial position of the bottles (1), detected by the localization module (301), with predefined end positions into which the bottles (1) are to be brought and which are stored in a memory (MEM).

20. The system according to claim 18, wherein said control module (302) comprises a calculation module (304) configured to calculate the amplitude and the direction of the rotations of the first actuator (2), second actuator (3) and third actuator (4) on the basis of the results of said comparisons.

21. A method for feeding and processing bottles to means (30) for entry into a filling station (40), which comprises the steps of:
feeding bottles (1) to a centrifuge (100);
setting a speed (Vc) for extraction of the bottles from the centrifuge (100) greater than a prefixed speed of reference (Vp);
extraction, from the centrifuge (100), of bottles (1) arranged horizontally and aligned in a longitudinal direction (X-X) of advancing movement;
entry of the horizontally arranged bottles (1) leaving the centrifuge (100) onto a first movement device (12);
movement of the bottles (1) in a longitudinal direction (X-X) of advancing movement and at a first speed (V12) less then the speed (Vc) at which they leave the centrifuge;
transfer of the bottles leaving the first movement device (12) onto a second movement device (13)
operation of the second movement device (13) at a second speed (V13) less than or the same as the first speed (V12) of the first movement device;
transfer of the bottles (1) from the first movement device onto a third movement device (14);
movement of the third feed device (14) at a speed (V14) greater than the speed of the first movement device (13) and depending on the speed (Vp) of the filling machine;
first rotation through 90° of the handling device in a clockwise/anti-clockwise direction, depending on the preferential orientation of one of the side surfaces (1c) of the bottle, about a respective first axis of rotation parallel to the longitudinal direction (X-X) of advancing movement of the bottles;
second rotation through 90° of the handling device in a clockwise/anti-clockwise direction about a second axis of rotation (II) at right angles to the longitudinal direction (X-X) of advancing movement of the bottles depending on whether the bottle is oriented front-endwise or back-endwise in the direction of advancing movement (X-X);
displacement of a support (25; 1025) of the handling device (21) in the transverse direction (Y-Y) towards the screw feeder (30) with recovery of the height lost/gained by the first rotation in a clockwise/anti-clockwise direction of the handling device (21);
downwards displacement in the vertical direction (Z-Z) of the support (25; 1025) and deposition of the bottle (1) in the seat (30a) of the screw feeder (30);

upwards displacement in the vertical direction (Z-Z) of the support (25; 1025);

return of the handling device (21) into the start-of-cycle position.

\* \* \* \* \*